(12) United States Patent
Feiereisel et al.

(10) Patent No.: US 8,307,136 B2
(45) Date of Patent: Nov. 6, 2012

(54) DATA MOVEMENT SYSTEM AND METHOD

(75) Inventors: Neil S. Feiereisel, Cedar Park, TX (US); Glen O. Sescila, III, Lago Vista, TX (US); Craig M. Conway, Leander, TX (US); Brian Keith Odom, Georgetown, TX (US); M. Dean Brockhausen, Jr., Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 12/534,492

(22) Filed: Aug. 3, 2009

(65) Prior Publication Data

US 2011/0029709 A1 Feb. 3, 2011

(51) Int. Cl.
*G06F 13/00* (2006.01)
(52) U.S. Cl. ............................ 710/100; 710/240; 370/84
(58) Field of Classification Search .......... 710/240–244, 710/260–269, 200; 370/84
See application file for complete search history.

(56) References Cited

U.S. PATENT DOCUMENTS

| | | | |
|---|---|---|---|
| 5,765,022 A * | 6/1998 | Kaiser et al. | 710/22 |
| 5,771,356 A * | 6/1998 | Leger et al. | 709/233 |
| 6,141,705 A | 10/2000 | Anand et al. | |
| 6,542,838 B1 | 4/2003 | Haddad et al. | |
| 7,085,846 B2 * | 8/2006 | Jenne et al. | 709/232 |
| 7,647,435 B2 * | 1/2010 | Check et al. | 710/29 |
| 7,911,952 B1 * | 3/2011 | Nygreen et al. | 370/235 |
| 8,127,052 B2 * | 2/2012 | Yoshioka | 710/22 |
| 2004/0005859 A1 | 1/2004 | Ghercioiu et al. | |
| 2007/0022204 A1 | 1/2007 | Moch et al. | |
| 2008/0172509 A1 * | 7/2008 | Tsunoda | 710/241 |

OTHER PUBLICATIONS

Co-pending U.S. Appl. No. 12/534,564 entitled "Processing System and Method", filed Aug. 3, 2009.
"Summary of National Instruments NI-FGEN and NI-SCOPE Driver Aug. 2008 Release", prepared Nov. 2009. (2 pages).
Official Action in U.S. Appl. No. 12/534,564 issued Apr. 20, 2011, 10 pages.

* cited by examiner

*Primary Examiner* — Brian Misiura
*Assistant Examiner* — Kim Huynh
(74) *Attorney, Agent, or Firm* — Meyertons Hood Kivlin Kowert & Goetzel, P.C.; Jeffrey C. Hood

(57) ABSTRACT

Provided is a method of streaming transfer of data between a plurality of devices of a computer system. The method includes providing data to be sent from a source device to a target device and includes receiving, at the source device, one or more transfer credits from the target device. A transfer credit may be indicative of an amount of data that the target device is authorizing to be sent to the target device. The method also includes determining whether or not an accumulated transfer credit value satisfies a threshold value. If the accumulated transfer credit value satisfies the threshold value, the source device sends data to the target device and modifies the accumulated transfer credit value based on a quantity of data sent. If the accumulated transfer credit value does not satisfy the threshold value the source device does not send data to the target device.

21 Claims, 9 Drawing Sheets

DATA MOVEMENT SYSTEM AND METHOD

BACKGROUND OF THE INVENTION

1. Field of the Invention

This invention relates to streaming transfer of data between a plurality of devices of a computer system and more particularly to regulating the flow of data between a plurality of devices of a computer system.

2. Description of the Related Art

Streaming generally refers to high-speed bulk data transfers between two devices. Streaming may occur between a peripheral device and a host computer or directly between two peripheral devices.

In some systems, such as data acquisition (DAQ) systems, there may be large quantities of data to be moved around within the system. For example, in a DAQ system, data may be sampled in a digitizer board and streamed to a Field Programmable Gate Array (FPGA) device on a processing card. The output of the processing card may be sent to a signal generation board for output, for instance. Alternatively, data may be retrieved from secondary storage by a host CPU on a host controller and sent to a first-in first-out (FIFO) device of a processing card. In systems where there are large quantities of data, frequent data movements and high bandwidth connections (e.g., PCIe), target devices (e.g., receiving devices) may frequently become full and, when this occurs, data movement may stall, resulting in errors or otherwise impacting system performance.

In some computer systems, a receiving device may be a storage element such as a Random Access Memory (RAM) or a first-in first-out device (FIFO). Typically, devices such as these perform programmed data transfers as fast as reasonably possible and with little consideration of the impact of such transfers on receiving devices or of the impact of such transfers on the wider system. As a result, many issues may occur, especially in systems where large quantities of data are frequently transferred between different elements across shared communication links (e.g., between different expansion cards). For example, data transfers may be stalled due to insufficient storage space at the target location, bus transactions may get backed up, buffers may overrun or underrun, FIFOs may become full, and so forth. In addition, in systems where data is streamed through multiple devices/PCBs issues such as these may, either individually or together, become problematic. In a computer system where there are two streams of data moving through a system interconnect, the presence of one stream (e.g., a backup of transfers) could cause problems for the second stream if the two streams share a portion of the system interconnect. For example, the system interconnect of some systems may include point-to-point communication links coupled to devices and to link switches where two data streams may, for a period of time, share a common communications link (e.g., a link between two switches). In such a situation, the presence of one data stream may have an adverse effect on the second data stream at the shared communications link. Accordingly it is desirable to provide technique that manages the transfer of data between devices of a computer system and is resilient enough to overcome various adverse impacts from other devices in the system, or to avoid those adverse impacts altogether by managing the flow of data between devices in a system.

SUMMARY

The following describes various systems and methods for the streaming transfer of data between a plurality of devices of a computer system. In one embodiment, provided is a method of streaming transfer of data between a plurality of devices of a computer system. The method includes providing data to be sent from a source (e.g. data sending) device to a target (e.g. data receiving) device and includes receiving, at the source device, one or more transfer credits from the target device. A transfer credit may be indicative of an amount of data that the target device is allowing to be sent from the source device to the target device. The method also includes determining whether or not an accumulated transfer credit value satisfies a send threshold value. If the accumulated transfer credit value satisfies the send threshold value, the source device sends data to the target device and modifies the accumulated transfer credit value based on a quantity of data sent. If the accumulated transfer credit value does not satisfy the send threshold value the source device does not send data to the target device.

In another embodiment, provided is a computer peripheral device that includes a buffer for storing data to be sent from the peripheral device to a target device, a data output that enables communication with the target device via a bus of a computer system and a transfer controller to regulate the transfer of data from the buffer to the bus. The controller is configured to receive one or more transfer credits from a target device. The transfer credit is indicative of an amount of data that the target device is allowing to be sent from the source device to the target device. The controller is also configured to determine whether or not an accumulated transfer credit value satisfies a send threshold value. The method includes, if the accumulated transfer credit value satisfies the send threshold value, sending data from the source device to the target device and modifying the accumulated transfer credit value based on a quantity of data sent. If the accumulated transfer credit value does not satisfy the send threshold value, not sending the data from the source device to the target device.

In another embodiment, provided is a computer peripheral device that includes a buffer configured to store data received by the peripheral device from a source device and a data input configured to enable communication with the source device via a bus of a computer system. The computer peripheral device also includes a transfer controller configured to determine one or more suitable quantities of data to be received and send, from the peripheral device to the source device, one or more transfer credits corresponding to the one or more quantities of data that can be received.

In another embodiment, provided is a computer system that includes a host computer device, a first peripheral device coupled to a bus of the computer system and a second peripheral device coupled to a bus of the computer system. The first peripheral device includes a first memory location and is configured to provide a transfer credit to a second peripheral device based on free space available or expected to be available in the first memory location. The second peripheral device is configured to send data to the memory of the first peripheral device and is configured to send at least a portion of the data to the first peripheral device via an interconnect based on the provided transfer credit.

BRIEF DESCRIPTION OF THE DRAWINGS

A better understanding of the present invention can be obtained when the following detailed description of the preferred embodiment is considered in conjunction with the following drawings, in which.

Figure 1:
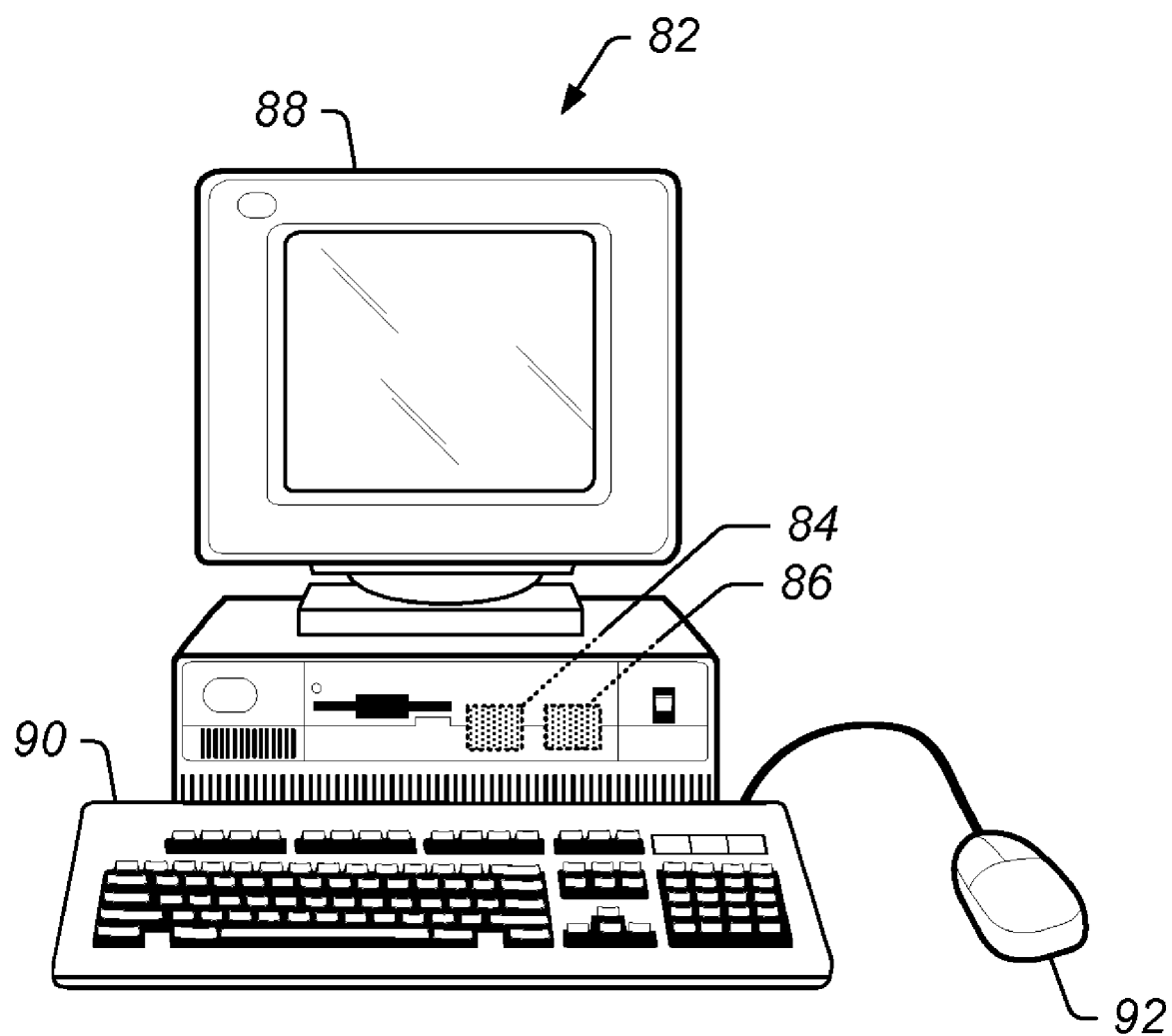
FIG. 1 is a diagram that illustrates an exemplary computer system in accordance with one or more embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (e.g., having the potential to, being able to), not a mandatory sense (e.g., must).

DETAILED DESCRIPTION

Definitions

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIFO—a first in first out device. A FIFO is commonly constructed from a static random access memory (SRAM). Data are output from a FIFO in the sequence it arrived, that is, the first arriving data item is the first to be sent. FIFOs may be implemented in hardware or software or a combination of hardware and software. FIFOs may also be implemented using/within a field programmable gate array (FPGA) device, and also using/within a RAM structure inside an FPGA device.

Streaming—refers to the quasi-continuous transfer of data. Data may be streamed from a source device (e.g., a data acquisition device) to a target device (e.g., a processing device or an output device) across an interconnect medium that may include combinations of networks, buses, switched fabrics and point-to-point links. Data may be streamed through intermediate devices and may be modified by those devices as it is streamed. Streaming is generally associated with large quantities of data being transferred in real-time.

Peripheral Device—refers to a device coupled to a computer system (e.g., one or more modular boards), that is not a host device (e.g., host processor, such as a CPU and/or host memory). A peripheral device may include a printed circuit board (PCB) or card that is installed into a modular computer system via an expansion slot (e.g., a slot of a rack or chassis). A peripheral device may include supporting circuitry such as processors, bus interface circuitry, storage elements (such as random access memory (RAM), read-only memory (ROM) and FIFOs), a peripheral controller/processor and its associated firmware.

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

As discussed in more detail below, certain embodiments include a technique for more efficiently moving data between devices of a computer system. In certain embodiments, techniques may be implemented to regulate the streaming of data between two or more devices. In some embodiments, two devices may communicate with one another to ensure that each device is ready to send/receive data, thereby helping to prevent problems (e.g., data overflows, data underflows) and system errors that may otherwise occur if data were to be sent when the receiving device was not ready. Some embodiments may include one or more of the following types of transfers: peripheral device to peripheral device transfers, CPU/host device to peripheral device transfers, and peripheral device to CPU/host device transfers, and the like. In some embodiments, the devices may include separate modular devices of a computer system. In certain embodiments, the devices may include modular peripheral devices, such as removable cards/devices of a racked computer system. In some embodiments, the sending device may include a peripheral device, such as a direct memory access controller (DMAC) that may be located on a data acquisition board, and the receiving device may be another peripheral device, such as one or more devices on a separate processing board. In some embodiments the devices may be coupled via a backplane/interconnect that may be shared with other devices in the system to send and receive data. In certain embodiments, the sending and receiving devices may be coupled via a "switched interconnect" that may provide point-to-point links (e.g., Peripheral Connect Interface express (PCIe)). In some embodiments, data may be sent from a first device to second device and, then may be sent from the second device to a third device and so on and so forth. In certain embodiments, the receiving devices may be storage devices (such as a FIFO or a RAM) that may be managed by circuitry and/or a controller. In some embodiments, a management technique may include tracking the quantity of incoming data, the quantity of outgoing data, the amount of storage occupied and/or the amount of free storage. Such a technique may help to ensure that both the sending device and the receiving device are ready to exchange data.

Turning now to the figures, FIG. 1 depicts an exemplary computer system 82 which may implement embodiments of the invention. Computer system 82 may be operable to execute the computer programs to implement computer-based systems and methods of data streaming described herein. The illustrated computer system 82 may include components such as CPU 84 and a memory medium 86, such as random access memory (RAM), flash memory, hard-drives, and/or CD-ROMs. Memory medium 86 may include a storage medium having program instructions stored thereon, wherein the program instructions are executable to implement one or more embodiments of the present technique. The program instructions may be executable by CPU 84, for instance. In the illustrated embodiment, computer system 82 includes a display device 88, such as monitor, an alphanumeric input device 90, such as keyboard, and a directional input device 92, such as mouse. In one embodiment, computer system 82 may include modular and plug-in boards/cards (e.g., with either commercially available or proprietary hardware) that may be added via a number of expansion slots internal or external to the computer body (e.g., PCI or PCI Express slots). This system may be used for a wide variety of functions. For example, computer system 82 may be used for data acquisition (DAQ) when a DAQ digitizing board is plugged in and associated software is run.

Figure 2A:
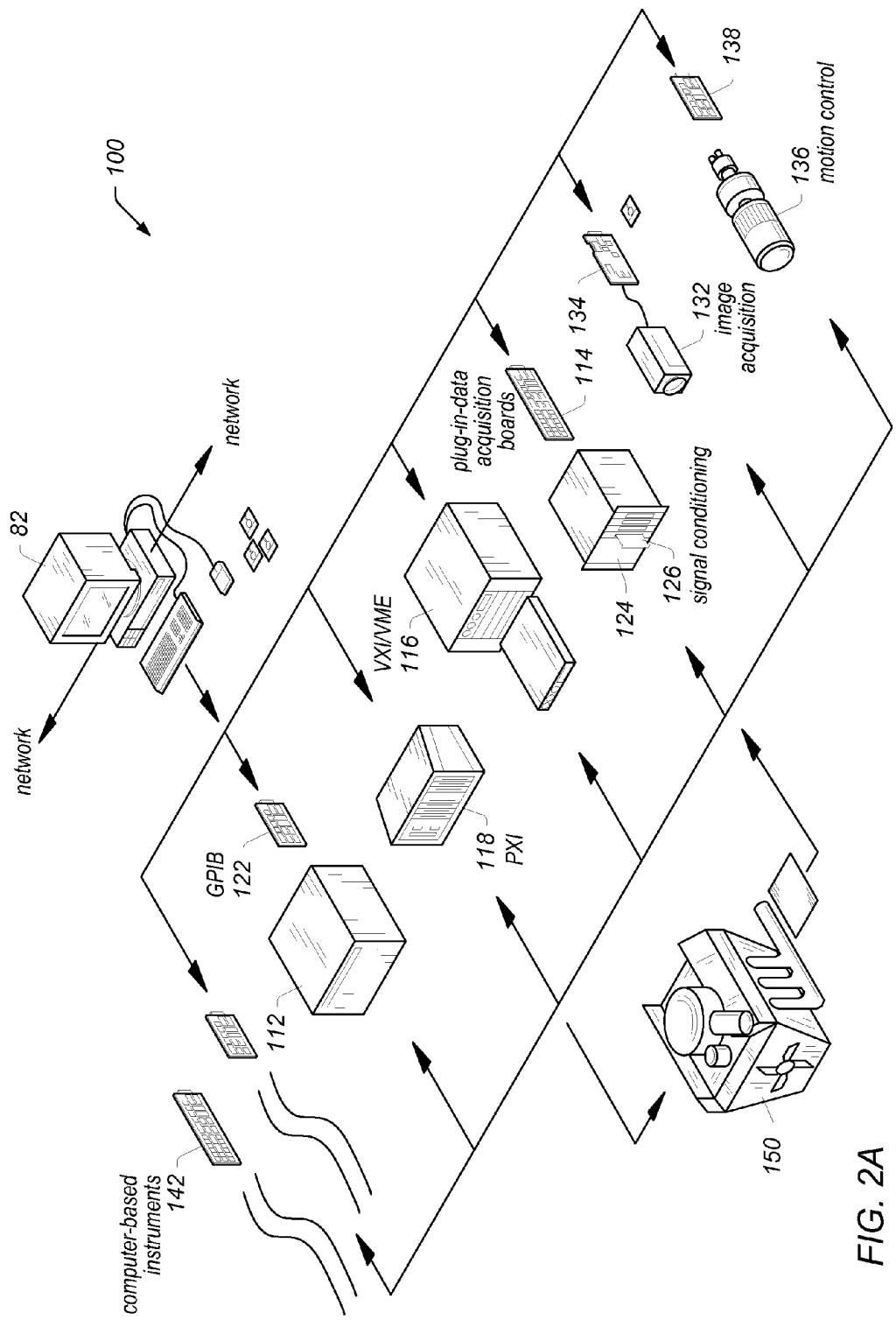
FIGS. 2A and 2B are diagrams that illustrate exemplary systems that may execute or utilize programs in accordance with one or more embodiments of the present invention.
Figure 2B:
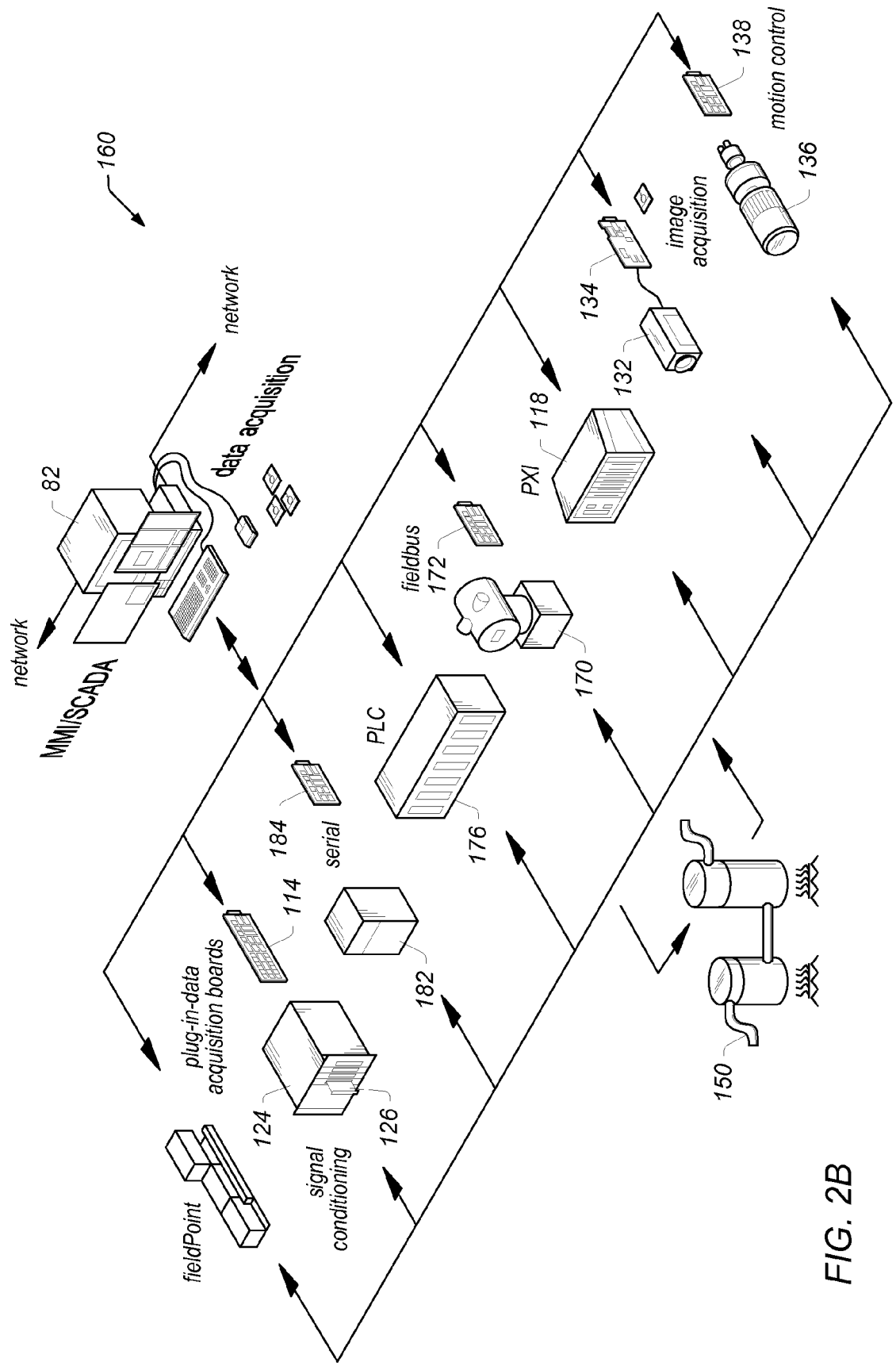

FIG. 2A illustrates an exemplary instrumentation control system 100 which may implement embodiments of the invention. FIG. 2B illustrates an exemplary industrial automation system 160 that may implement embodiments of the invention. The industrial automation system 160 may be similar to the instrumentation or test and measurement system 100 shown in FIG. 2A. Elements which are similar or identical to elements in FIG. 2A have the same reference numerals for convenience.

The illustrated system 100 may include host computer system 82 that may be configured to connect to one or more instruments/devices. In such a configuration, computer system 82 may operate with the one or more instruments to analyze, measure or control one or more devices or processes 150. Computer system 82 may operate with the one or more devices in communication with process or device 150 to perform an automation function, such as MMI (Man Machine Interface), SCADA (Supervisory Control and Data Acquisition), portable or distributed data acquisition, process control, advanced analysis, or other control, among others. System 100 may be used in a data acquisition and control application, in a test and measurement application, an image processing or machine vision application, a process control application, a man-machine interface application, a simulation application, or a hardware-in-the-loop validation application, among others.

According to embodiments, one or more of the instruments and devices of FIG. 2A (and FIG. 2B) may include a programmable hardware element, configured with an FPGA or a processor and memory, and may be further configured with one or more portions of user code, as will be described in more detail below. The one or more instruments may include a GPIB instrument 112 and associated GPIB interface card 122, a data acquisition board 114 and associated signal conditioning circuitry 124 and boards 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. Further, the one or more devices may include a fieldbus device 170 and associated fieldbus interface card 172, a Programmable Logic Controller (PLC) 176, a serial instrument 182 and associated serial interface card 184, or a distributed data acquisition system, such as the Fieldpoint system available from National Instruments Corporation, having headquarters in Austin, Tex., among other types of devices.

Figure 3:
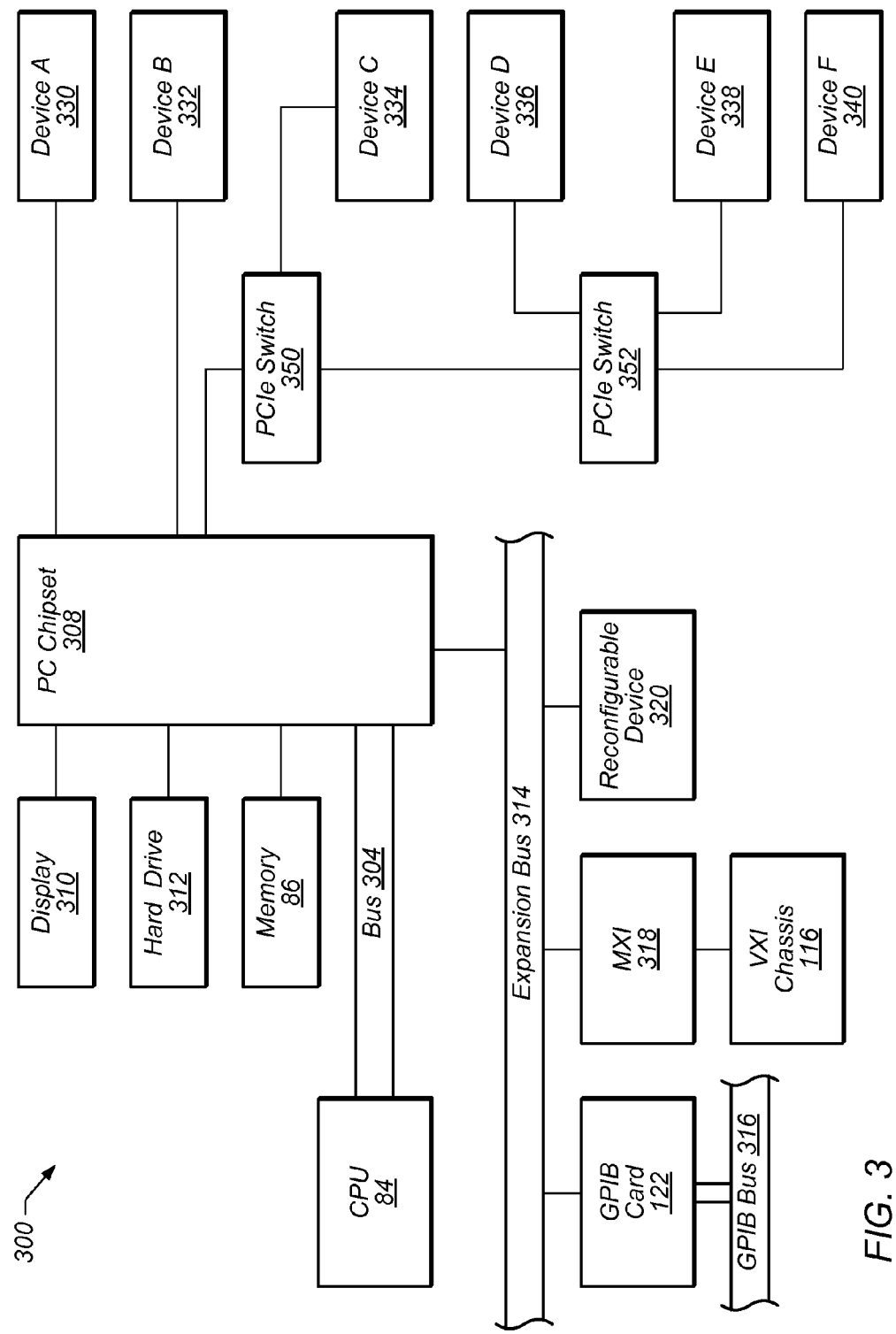
FIG. 3 is a block diagram that illustrates connectivity and buses of an exemplary system in accordance with one or more embodiments of the present invention.

FIG. 3 illustrates an exemplary computer system 300 that may implement embodiments of the invention. Computer system 300 may be similar to instrumentation system 100 or similar to industrial automation system 160. It may also be noted that computer system 300 may be illustrative of a general-purpose desktop computer system, or a modular (e.g., racked) computer system held in a chassis, or the like. It may also be noted that many types of computer system configuration or architecture may be used as desired, and that FIG. 3 illustrates representative embodiments. Certain elements of the computer system that are not necessary to understand embodiments of the invention have been omitted for simplicity.

Computer system 300 may include at least one central processing unit (CPU) or "processor" 84 that may be coupled to bus 304, for example, a front side bus. CPU 84 may be any of various types, including an x86 processor, a PowerPC processor, a CPU from the SPARC family of RISC processors, as well as others. A memory medium, typically comprising RAM and referred to as memory 86 may be coupled to bus 304 by means of a PC chipset ("chipset") 308. Chipset 308 may include one or more components that function together to provide some of the functions found in modern personal computers. In system 300, chipset 308 may implement a memory controller, expansion bus controller and a host PCIe complex. As noted above, memory 86 may store a programming development environment, e.g., a graphical programming development environment, as well as one or more programs implementing and/or used in embodiments of the present invention. Memory 86 may also store operating system software, as well as other software for operation of computer system 300. Computer system 300 may further include a video display subsystem 310 and hard drive 312 coupled to chipset 308. In embodiments, components shown in FIG. 3 as coupled to chipset 308 (e.g., display subsystems 310 and hard drive 312) may be coupled to an expansion bus.

As depicted, in one embodiment, bus 304 may be coupled to an expansion bus 314 via chipset 308. Expansion bus 314 may be a PCI (Peripheral Component Interconnect) expansion bus, although other bus types may be used. Expansion bus 314 may connect to card slots for the integration of various devices such as those described above. These devices may include GPIB card 122 and a GPIB Bus 316, a MXI interface 318 coupled to a VXI chassis 116, and/or a similar reconfigurable device 320, for instance. In one embodiment, reconfigurable device 320 may include a processor and memory implemented on (e.g., configured on or included in), or coupled to, a programmable hardware element, such as an FPGA. Computer system 300 may be operable to deploy a program, e.g., a graphical program, to reconfigurable device 320 for execution of the program on reconfigurable device 320, with respective portions of the program possibly implemented on the programmable hardware element, and stored in the memory for execution by the processor. Reconfigurable device 320 may be any of a variety of device types, such as those described above with reference to FIGS. 2A and 2B.

In some embodiments, a deployed program may take the form of program instructions, e.g., graphical instructions, or data structures that directly represent the program. Alternatively, the deployed program (or a portion of the program) may take the form of text code (e.g., "C" code) generated from a graphical program. As another example, the deployed program, or a portion of the program, may take the form of compiled code generated from either the graphical program or from text code that in turn was generated from the graphical program. Computer system 82, e.g., via the programming development environment, may be operable to target (e.g., compile) respective portions of the user code for execution by the processor and for implementation as hardware on the programmable hardware element (e.g., the FPGA) as needed to meet performance criteria (e.g., resource use, timing, and I/O constraint criteria), and may be further operable to deploy the portions to their respective targets.

Computer system 300 may support PCI Express. In one embodiment, PC Chipset 308 may directly support a limited number of PCIe devices, but an expanded number of PCIe devices may be supported through the use of PCIe switches. In one embodiment, some (or all) of the attached PCIe devices may be integrated into computer system 300 using printed circuit board (PCB) cards or boards. PCIe devices may vary widely in terms of function. Device types may include input devices (e.g., video capture devices and digitizers), output devices (e.g., arbitrary waveform generators, or secondary storage interface devices), data processors (e.g., data processors used for analysis, test and control) and similar reconfigurable devices. Generally speaking, the types of devices integrated may reflect the intended use of system 300.

Looking now at the exemplary embodiments of PCIe connectivity illustrated in FIG. 3, chipset 308 directly connects to device "A" 330 and device "B" 332. Data may be transferred between devices 330 and 332 by flowing through direct connections made to chipset 308. Chipset 308 also connects to PCIe switch 350. Directly connected to switch 350 are device "C" 334 and PCIe switch 352. Connected to PCIe switch 352 are device "D" 336, device "E" 338 and device "F" 340. PCIe switches 350, 352 may make connections between connected devices so that, for example, device "E" 338 may send data to device "F" through switch 352, without the data going to PCIe switch 350. Note that, in computer system 300, a wide variety of connections may be made through the two switches 350, 352 and through chipset 308. Note that with this topology, multiple data transfers may happen concurrently. For example, device "A" 330 may send data to device "D" 336 via chipset 308 and PCIe switches 350, 352. At the same time device "E" 338 may send data to device "F" 340 via PCIe switch 352. An indirect transfer of data may refer to a transfer of data between devices that includes passing the data to or through a processor or memory of a host processing unit. With respect to devices of system 300, transfers between devices (e.g., peripheral devices) that involve the transfer of data from one peripheral device to another peripheral device through a processor of host CPU (e.g., host CPU 84) or through host memory (e.g., memory 86) may be referred to as indirect transfers. Indirect transfers typically involve two stages, where stage one involves a transfer from a source device to a system host processor/memory and stage two involves a transfer from a system host processor/memory to a target device. An indirect transfer in system 300, for example, may include a data transfer from device "A" 330 to device "C" 334 in two stages. In one embodiment, data is transferred from device "A" 330 to memory 86 (e.g., by device "A" 330 or by host CPU 84) through chipset 308 and then data is transferred from memory 86 to device "C" 334 (e.g., by device "C" 334 or host CPU 84) through chipset 308 and PCIe switch 350. Such an indirect transfer may include a data transfer from a first peripheral device to a second peripheral device where the data is transferred through a processor and/or memory of a host CPU, such as from device 330 to any of the other devices 332-340 through a processor of host CPU 84 and/or memory 86. A direct transfer of data may refer to a transfer of the data between devices without passing the data to or through a processor or memory of a host processing unit. Transfers from one peripheral device to another peripheral device through one or more buses and/or one or more links and/or one or more switches may be referred to as direct transfers, provided data is not routed through a system host processor/memory. In systems where a bus complex is integrated into the same device as a host CPU, transfers through the bus complex portion of the integrated device may still be considered to be direct, provided data is not routed through the processor or memory portion of the CPU device. In one embodiment a direct transfer may include data transfer from a first peripheral device to a second peripheral device via a PCIe Switch, such as from device "D" 336 to device "E" 338 via PCIe switch 352. For example, a direct transfer in system 300 may involve device "A" 330 transferring data to device "C" 334, through chipset 308 and switch 350, without data routing through memory 86 or CPU 84. This may be referred to as a direct transfer as data transferred via chipset 308 is not routed through a processor of CPU 84 and/or memory 86. In some embodiments, host chipsets (e.g., chipset 308) may include functionality similar to a PCIe switch (e.g., switch 350, switch 352). In such embodiments, data routed through chipset 308 may be routed through the PCIe switch portion and may not involve (or indeed pass through) the host CPU (e.g., CPU 84) or host memory (e.g., system memory 86) or other host resources. In such embodiments, and in such cases, the transfer of data from one peripheral to another peripheral through chipset 308 may be considered to be a direct transfer as it does not invoke substantial functionality (e.g., processing functionality) of the host controller board or chipset, even though the transferred data may pass through a portion of the host controller board and host chipset. Embodiments similar to that described with respect to computer system 300 may have zero or more PCIe switches, and those PCIe switches may support different numbers of devices.

Figure 4:
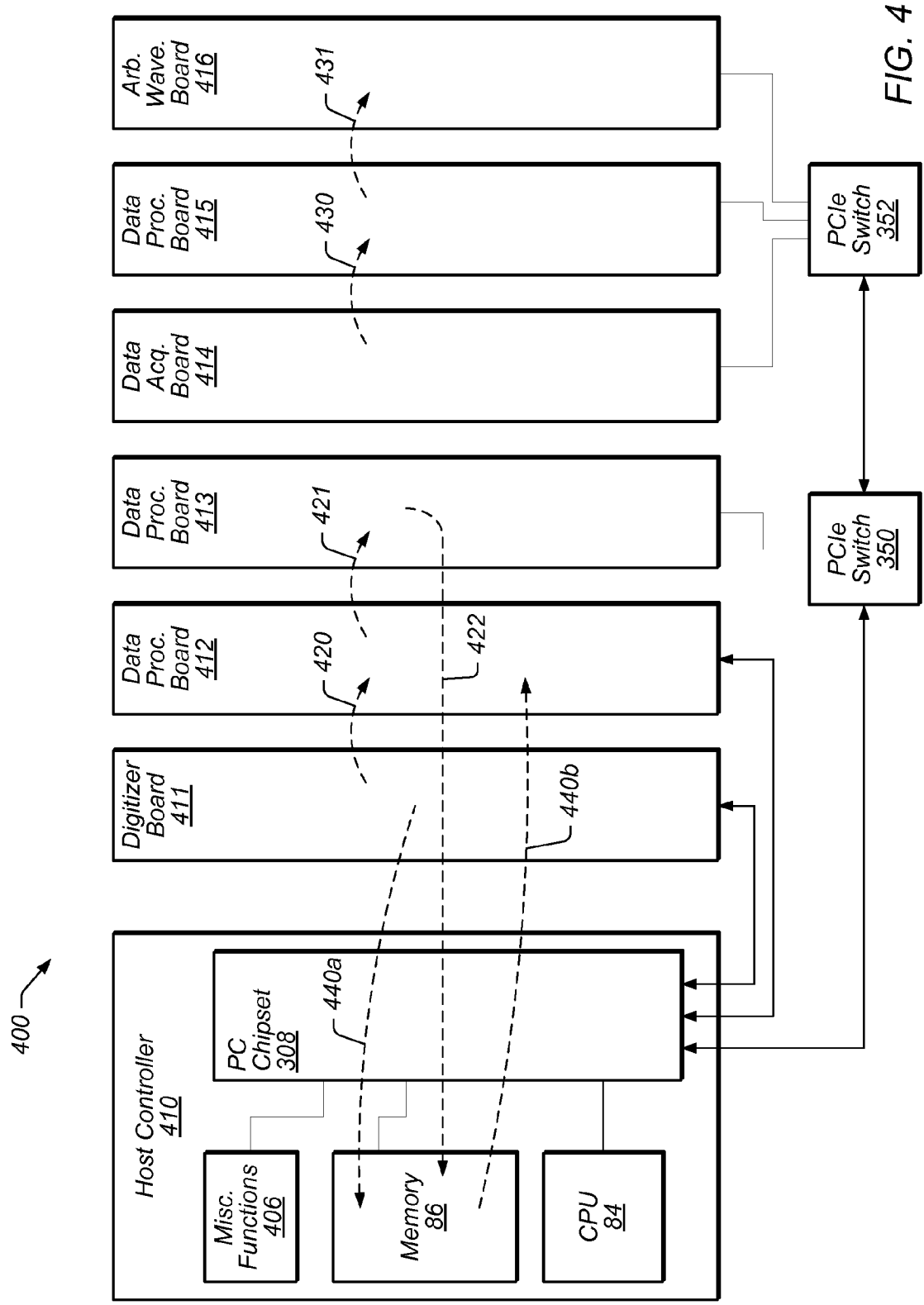
FIG. 4 is a block diagram that illustrates data movement between devices of an exemplary computer system in accordance with one or more embodiments of the present invention.

FIG. 4 is a block diagram that depicts a computer system 400 in accordance with one or more embodiments of the present technique. Computer system 400 may be used for industrial purposes (e.g., test, instrumentation, process control), for instance. Depicted is an exemplary embodiment showing device (e.g., board) level PCIe connectivity and data flow between devices (e.g., between peripheral devices/boards). In the illustrated embodiment, system 400 includes a host controller board 410 having a CPU 84, memory 86, and chipset 308. Other functions that may be found on the host controller board 410 are represented by the miscellaneous functions block 406. Chipset 308 may provide PCIe links to a first peripheral device ("digitizer board") 411, a second peripheral device ("data processing board") 412 and peripheral device interconnect ("PCIe switch") 350. In the illustrated embodiment, directly connected to PCIe switch 350 are a third peripheral device ("data processing board") 413 and a peripheral device interconnect ("PCIe switch") 352. Connected to PCIe switch 352 are a fourth peripheral device ("data acquisition board") 414, a fifth peripheral device ("data processing board") 415 and a sixth peripheral device ("arbitrary waveform generation board") 416. It will be appreciated that the type, number and arrangement of the peripheral devices is merely exemplary and are not intended to be limiting.

Embodiments of system 400 may be used in test and measurement systems, such as systems used to acquire, process or output data relating to a device or process being monitored or controlled, for instance. Accordingly, such a system may acquire data, and subsequently transfer the data for processing, storage, output, or the like. For example, in the case of system 400 being used to control a process (e.g., a closed loop system) data may be acquired, transferred to a processor where it may be processed, and subsequently transferred to an output such that the processed output may be employed to appropriately control the respective process. Often, streams of large amounts of data may be required to ensure data is being transferred at an appropriate rate. Moreover, where devices are used to implement several processes, certain channels for transferring data may include bottle-necks that slow the transfer of data or that otherwise inhibit the performance of the system. For this reason, in some embodiments, it may be beneficial to implement certain regulations relating to the transfers, and/or it may be beneficial to move data directly between the various peripheral devices (e.g., boards) that perform these different functions. For instance, the computer system 400 may support concurrent direct transfers of data between one or more of boards 410-416 via system connectivity.

In some embodiments, data may be transferred from a source (sending) device to a target (receiving) device of system 400. The nomenclature of these devices may be used interchangeably based on the current role of the device (e.g., whether or not the device is sending or receiving data). In the illustrated embodiment, a first set of transfers is indicated by dashed lines 420-422. In the illustrated embodiment, for instance, line 420 may represent data captured by digitizer board 411 that sent via chipset 308 to data processing board 412 for data processing (e.g., filtering to remove noise). Dashed line 421 may represent the transfer of data output from processing board 412 to board 413 for additional processing (e.g., filtering to remove artifacts). Dashed line 422 may represent the transfer of data from processing board 413 to host controller 410 (e.g., for storage of data in memory 86). A second set of transfers, indicated by dashed lines 430 and 431, may be performed independent of and/or concurrent with the first set of transfers 420 and 421. In the illustrated embodiment, for instance, dashed line 430 may represent the transfer of data from DAQ board 414 to data processing board 415 (e.g., for analysis or processing), and dashed line 431 may represent the transfer of data from board 415 to arbitrary waveform generation board 416 (e.g., for outputting an analog waveform). Such transfers (430, 431) may occur via PCIe switch 352.

Note that parts of these transfers may happen concurrently. For example either 430 or 431 may occur concurrently with any of 420, 421, 422 and many other concurrent transfer combinations are possible. Note also that transfers 420, 421, 430 and 431 may be performed as direct transfers (e.g. transfers that do not route data through memory 86. Transfers 420 and 421, while they may route data through the chipset 308, may route data through a host PCIe root complex contained in chipset 308 and may avoid routing data through memory 86. Dashed lines 440a and 440b depict an example of an indirect transfer (or pair of transfers) that may be performed as an alternative to transfer 420. The first stage of this example indirect transfer (depicted by dashed line 440a) is a transfer of data from digitizer board 411 through chipset 308 to memory 86. This transfer stage may be performed by board 411, by CPU 84 or by circuitry on host controller board 410 (e.g., chipset 308). The second part of this indirect transfer (depicted by line 440b) is a transfer of data (e.g., the data moved from board 411) from memory 86 to processor board 412. This transfer stage may be performed by processor board 412, by CPU 84 or by circuitry on host controller board 410 (e.g., chipset 308).

Figure 5:
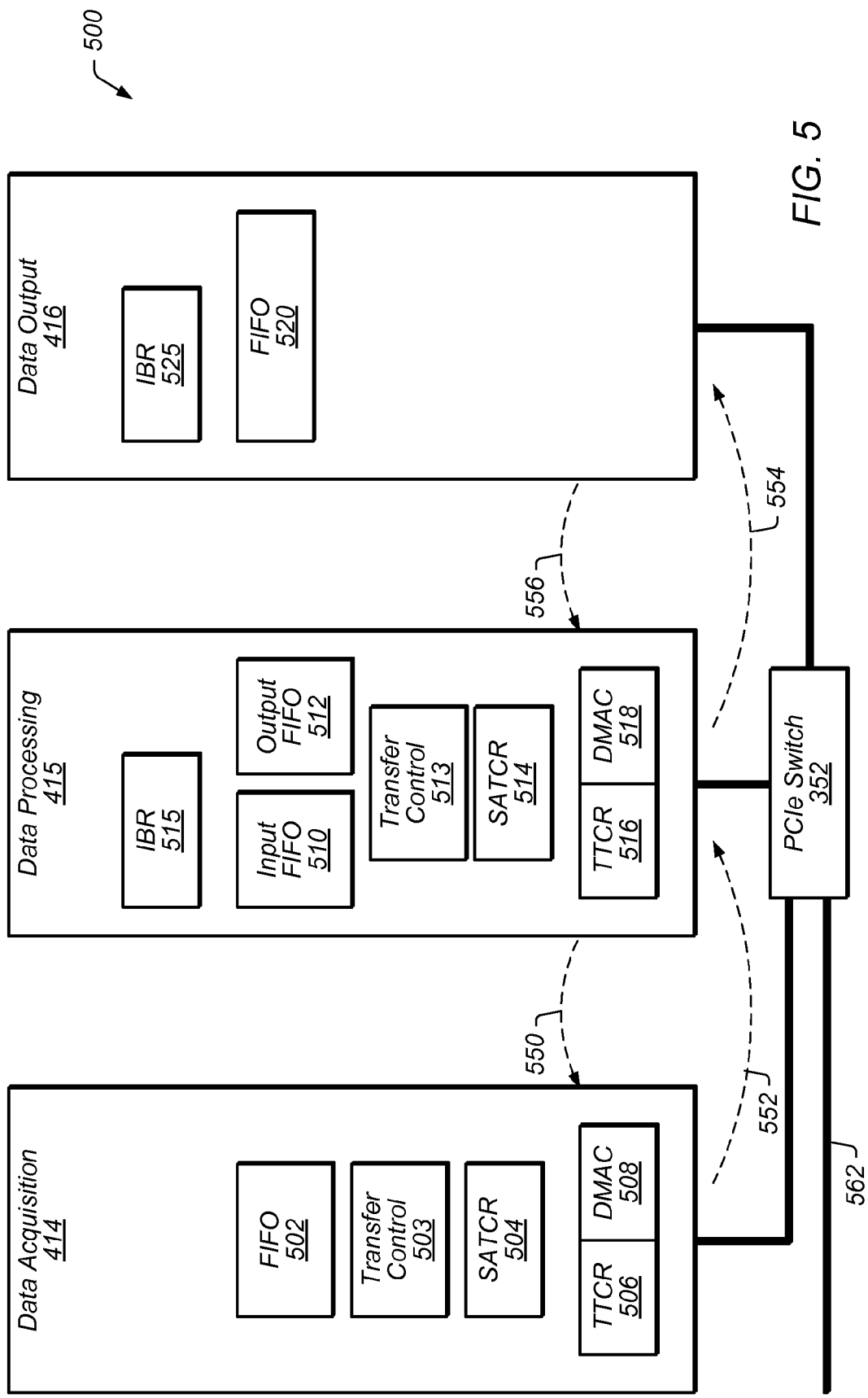
FIG. 5 is a block diagram that illustrates a portion of an exemplary computer system in accordance with one or more embodiments of the present invention.

FIG. 5 is a block diagram representing an exemplary portion 500 of system 400 illustrated in FIG. 4. In the illustrated embodiment, exemplary portion 500 includes three devices: data acquisition board 414, data processing board 415 and data output board 416. Note that other embodiments may have different combinations of boards and different types of devices. For instance, embodiments may include combinations of peripheral devices or combinations of one or more host devices and peripheral devices. In certain embodiments, one or more portions of the devices) may be integrated onto a single device, such as multiple PCIe devices and/or PCIe switches integrated into single modular peripheral device. Embodiments of the invention are not limited in terms of the physical design of the computer system or in terms of the functions of the PCIe devices.

In one embodiment, DAQ board 414 may include an input device that receives data, and thus may be a source of data to be processed and output by sub system 500. For example, DAQ board 414 may include a digitizer that receives an analog electrical signal, and digitizes the signal into computer readable data ("data"). In one embodiment, the data may be stored or processed on DAQ board 414. In one embodiment, the data may be transferred to another portion of the computer system for storage at another location and/or processing at another location within the system. For example, the data may be transferred to the system host (such as host controller 410, which is not depicted but may be connected via PCIe link 562) and/or another peripheral device, such as data processing board 415. The transfer of data may include "indirect" or "direct" transfers of the data between devices. As discussed briefly above, in order to allow the system to operate reliably it may be beneficial to implement devices and techniques to regulate the transfer of data between devices, such as the streaming of data between devices.

In the illustrated embodiment, DAQ board 414 may include a buffer ("FIFO") 502 for managing the flow of data being captured and being transferred. Data may be transferred using direct memory access controller (DMAC) 508 which may be programmed to automatically transfer data. In one embodiment, DMAC 508 may be programmed by transfer control logic 503. The transfer control logic 503 may determine the characteristics data transfers including, whether or not a transfer should be initiated. Transfer control logic may be coupled to FIFO 502.

As depicted in FIG. 5, DAQ board 414 may also include two registers, a stream additive transfer count register (SATCR) 504 and a total transfer count register (TTCR) 506. SATCR 504 may include a mechanism used to control the initiation of data transfers. For example, SATCR 504 may be associated with and/or monitor a SATCR value indicative of whether or not a source ("sending") device should initiate a transfer of data to a target ("receiving") device. As discussed in more detail below, the SATCR value associated with SATCR 504 may be indicative of the number of bytes that a receiving device is able to receive. For example, the SATCR value may be written by software and/or hardware and may be adjusted (e.g., decreased/increased) by hardware as data transfers are initiated by board 414. In one embodiment, the amount that the SATCR value is decreased/increased may correspond to the byte count of the data transfer being initiated. In one embodiment, transfer control logic 503 may be configured to initiate transfers only as long as the SATCR value is above a certain threshold, thereby helping to ensure that the receiving device is capable of receiving the amount of data being sent. In other words, control logic 503 may be configured to not initiate data transfers that may cause the value of the SATCR 504 to drop below a threshold (e.g., zero) to help ensure that there is enough space for the data at the receiving device, thereby helping to prevent data over-run at the receiving device. Note that, depending on the embodiment, the value of transfer credits may be represented in different ways. For example, in one embodiment, an increase in the value of transfer credits may equate to an increase in a corresponding number. In another embodiment, an increase in the value of transfer credits may equate to a decrease in a corresponding number. Transfer credit threshold values may be set according to the embodiment and according to the representation of transfer credits used in that embodiment. So, for example, in some embodiments the value of transfer credits dropping below a threshold may actually correspond to an associated number rising above a threshold.

Due to the latency involved, the performance of sub system 500 may be impacted if software were to programmatically pause data transfers in order to write/update a new value to SATCR 504. Such a pause may be attributed to software writing a control bit to pause hardware transfers, reading the current SATCR value of SATCR 504, and then writing an updated value before un-pausing the hardware. The pausing transfers may be expected by those skilled in the art since the SATCR may be adjusted both by circuitry (e.g., as data is transferred) and also by software writes (e.g., by a target device granting more transfer credits). Since it is possible that two adjustments may be made coincidentally, some kind of adjustment error or problem may be anticipated. However, in some embodiments the SATCR may have associated circuitry that prevents problems arising from a coincidence of software and hardware adjustments. In one embodiment, values written to SATCR 504 may be automatically added to the current value via hardware. Such a method may allow writes (e.g., originating in hardware or software) to continually increase the amount of data that hardware is enabled to transfer by simply writing directly to SATCR 504 for each update. In such an embodiment, SATCR 504 may be updated via communication between two hardware devices. Thus, updates may occur before the register reaches zero and hardware may be stalled only when desired, such as when synchronizing hardware with software. In such an embodiment, a sending device (e.g., board 414) may monitor the SATCR value of the SATCR 504 which has been updated based on signals/values received directly from a receiving device (e.g., board 415) depicted in the dotted line 550, such that the two peripheral devices may regulate the transfer of data between them without transferring such flow control information using a host device or through host controller memory.

When using a SATCR 504 as described above, register accesses from software may be reduced to a single write per target device update. Further, transfers (e.g., DMAC-based transfers) may be decoupled from software's flow control mechanism such that unnecessary stalls are reduced.

In one embodiment, TTCR 506 may be used to track the amount of data sent/transferred by a device. For example, TTCR 506 may include a readable status register that may provide a total byte count of the data that has been transferred since the beginning of one or more DMA operations. In some embodiments, reads of this register are coherent such that the value returned may be immediately acted upon without any further synchronization steps. For example, a TTCR of a sending device, such as board 414, may be read to determine how much data has been sent to a receiving device, such as board 415. The coherency of a TTCR register may enable the data associated with TTCR to be read by the receiving device with minimal or no further synchronization steps. The coherency also allows the sending device to immediately free or reuse locations associated with the data that the TTCR indicates has been sent.

In some embodiments, system 400 and/or sub-system 500 may implement a technique known as "DMA Progress Status Pushing" (DPSP). Such a technique may include automatically writing (e.g., via hardware) the TTCR value (e.g., TTCR 506) to a specific location where it may be read. This location may be in a memory (e.g., memory 86) or it may be in a memory or a register on the target device (e.g., board 415), for example. The hardware may write every time a predetermined (e.g., fixed and/or programmable) amount of DMA data bytes have been transferred. This may avoid some costly hardware register reads of TTCR and may allow driver software to monitor DMA progress by reading the information from a more convenient location. Like reads of TTCR referred to in the previous section, in one embodiment, a status push of TTCR is guaranteed to be coherent with the data being sent to the same destination. The reader of the status pushed TTCR may act immediately on the TTCR value. The hardware may also be capable of "pushing" (e.g. writing) the TTCR value at the end of a transfer operation since the end may not coincide with a multiple of the programmed DPSP byte count. A bit in the pushed value may be used to distinguish between pushes that were triggered by the programmed byte count being transferred and the push at the end of an operation.

Both reads of TTCR and DMA Progress Status Pushing may be employed in situations where a controller desires to query DMA progress. In one embodiment, interrupts may notify a controller when DMA progress is made. For example, in one embodiment, a technique referred to as "Every N Notification" (ENN) may be used to interrupt a controller each time a fixed and/or programmable number of bytes have been transferred. In one embodiment, this feature may be combined with DMA Progress Status Pushing so that, for each interrupt, the controller may obtain updated status about DMA progress without performing a read of a TTCR on the sending device. As with DMA Progress Status Pushing, the control hardware associated with ENN may also generate an interrupt at the end of a transfer operation since the end may not coincide with a multiple of the programmed ENN byte count.

Some embodiments may involve interrupting a controller (e.g., a host CPU or a peripheral controller) when a specific number of bytes have been transferred. Instead of interrupting on a regular basis a device controller may wish to specify a particular byte count and receive an interrupt at that point. The number of bytes that the device controller specifies may vary during operation. A Total Transfer Count Compare Register (TTCCR) may allow a controller to specify a total byte count at which an interrupt is desired. In one embodiment, the TTCCR may be hardware based. In such an embodiment, hardware may generate an interrupt when an associated TTCCR reaches a value associated with the specified byte count. After receiving the interrupt the controller may be free to specify another value for subsequent notification.

Some embodiments may support a feature with similar functionality to ENN. Certain embodiments may include additional circuitry on sending and receiving devices. In one embodiment, a technique referred to as "Every N Doorbell" (END) may include a hardware initiated write of a programmable data value to a specific address every time a predetermined (e.g., fixed or programmable) number of bytes have been transferred. The specific address may correspond to a register location on a receiving device. In one embodiment, hardware on the receiving device may, on detecting a write to the register at the specific location, cause an interrupt to be sent to an associated controller. In certain embodiments (e.g., embodiments with a system interconnect based on PCIe) doorbell functionality may be advantageous if the bus protocol associated with system interconnect provides limited dedicated or explicit means for one peripheral device to interrupt another peripheral device. In such embodiments, doorbell functionality may be advantageous even when the system interconnect provides an interrupt mechanism directed at a host CPU.

A register that generates an interrupt when the register is written may be referred to as a "doorbell". Some embodiments may include a doorbell register. In one embodiment, a write to a doorbell register may be coherent with transmitted data at a target device. For example, in one embodiment, a doorbell may generate interrupts to a co-processor target device that may be coherent with received data in the co-processor's memory. In one embodiment, DMA Progress Status Pushing may be combined with the END technique so that the coprocessor may quickly retrieve a progress status from its local memory with each doorbell interrupt. In one embodiment, a doorbell write may also be initiated at the end of a data transfer operation where the quantity of data transferred may not be a multiple of the predetermined N byte count. Similarly, in one embodiment DMA Progress Status Pushing may occur at the end of a data transfer operation and the pushed value may include a bit that may be used to distinguish between a push that was triggered by a multiple of N and a push that was triggered by the end of the data transfer operation.

In one embodiment, a first value in a TTCCR may be overwritten with a smaller second value before an interrupt corresponding to the first programmed value is generated. Such a technique may allow a peripheral controller, for example, to be notified at an earlier point in the data stream than may have been previously specified. Some embodiments may include preventing the overwriting of a first value in a TTCCR with a larger second value before an interrupt corresponding to the first programmed value is generated. This may help to avoid a race condition. In such embodiments software may be restricted to waiting until a previously programmed interrupt is received before trying to program a new value.

Looking now at the processing of data and the movement of data between devices, in one embodiment, multiple devices, such as the three boards (414, 415 and 416) of sub-system 500, may form a sequential processing chain. For example, the devices may acquire data, processes data, and generate an output. Using techniques, such as those described herein, large quantities of data (e.g., many giga bytes or tera bytes) may be moved between the boards as the processing steps in the chain are performed. In addition, sub-system 500 may perform a large number of simultaneous data movements during operation within system 400.

As discussed above, in one embodiment, DAQ board 414 may include an input device that receives data, and thus may be a source of data to be processed and output by sub system 500. For example, DAQ board 414 may include a digitizer that receives an analog electrical signal, and digitizes the signal into computer readable data ("data"). In one embodiment, the data may be stored or processed on DAQ board 414. For example, the data may be stored in FIFO 502 of DAQ board 414 in preparation for sending to data processing board 415. In one embodiment, the data transferred to DAQ board 415 is transferred into an input FIFO 510. In one embodiment, when there is adequate space in input FIFO 510 of board 415, board 415 may write (as indicated by 550) to SATCR 504, in order to grant board 414 the ability to transfer data. As referred to herein, "transfer credits" may be used to describe the amount of data the receiving device has allotted or otherwise given permission for the sending device to transfer to the receiving device. In one embodiment, credits may include a number of bytes a sending device may transfer to the receiving device based on free space available in a buffer of the receiving device. For example, where the receiving device has 128 bytes of free space and a transfer credit is indicative of 1 byte, 128 transfer credits may be provided to the sending device to indicate that it may send 128 bytes to the receiving device. During use, multiple transfer credits and/or sets of transfer credits may be issued to the sending device such that they are accumulated. The total number of transfer credits currently available to the sending device may be referred to as the "accumulated transfer credit value." The total accumulated transfer credit value may be increased as additional transfer credits are issued from the receiving device, and reduced as data is sent, using at least a portion of the issued transfer credits.

In one embodiment, transfer control logic 503 may determine that sufficient transfer credits have been granted for a data transfer to take place. In one embodiment, if it is determined that sufficient transfer credits have been granted, transfer control logic 503 may enable DMAC 508 to transfer data to data processing board 415, for example. DMAC 508 may then transfer data to input FIFO 510. In one embodiment, the transfer of data may occur directly via a PCIe point-to-point link connected at PCIe switch 352. In one embodiment, DAQ board 414 may write (as indicated by dashed line 552) data transfer information (e.g., the value of TTCR 506) to location Input Bytes Received (IBR) 515 to communicate transfer progress to board 415. Data processing board 415 may use the value of IBR 515 to determine how much data it has received. Data processing board 415 may determine the quantity of received data and then may read the exact or an associated amount of data out of input FIFO 510 for processing, freeing up space in FIFO 510 as the data is read. As board 415 performs these actions it may grant more data transfer credits (by writing to SATCR 504 as indicated by dashed line 550) for the newly freed space in FIFO 510. Thus, as space is freed in the FIFO of the receiving device (e.g., board 415), the receiving device may dynamically issue transfer credits to the sending device 414. Transfer control logic 503 may monitor SATCR 504 for additional credits and if it determines that sufficient additional credits have been granted, it may send additional data to DMAC 508 to be transferred to board 415. Such a technique may enable a stream of data to be transferred between the devices.

In one embodiment, data processed by board 415 may remain on board 415 and/or it may be transferred to another device or location for processing, storage, output, or the like. In one embodiment, for instance, data processed by board 415 is placed in output FIFO 512 in preparation for transfer to data output board 416 for output (e.g., via an external connection to a DUT or process 150 as described with respect to FIGS. 2A and 2B). Similar to the above described embodiments, data output board 416 may determine if there is sufficient space in FIFO 520 and may grant transfer credits accordingly to board 415 by writing (as indicated by dashed line 556) to SATCR 514. Transfer control logic 513 on data processing board 415 may determine that the accumulated transfer credit value is sufficient for a data transfer and enable the DMAC 518 to transfer data to FIFO 520. The DMAC 518 may transfer data by sending data directly to FIFO 520 of output board 416 via PCIe switch 352. In one embodiment, data processing board 415 may write (as indicated by dashed line 554) data transfer information (e.g., the value of TTCR 516) to location Input Bytes Received (IBR) 525 to communicate transfer progress to board 416. Data output board 416 may read/output data from FIFO 520 (e.g., to an output) and, as data is read, more space is freed in FIFO 520, thereby enabling data output board 416 to grant additional transfer credits to data processing board 415 (as indicated by 556). In response to receiving more transfer credits from data output board 416, the accumulated transfer credit value may increase. This may, in one embodiment, enable transfer control logic 513 to transfer more data from output FIFO 512 to DMAC 518 to be transferred to FIFO 520.

Figure 6:
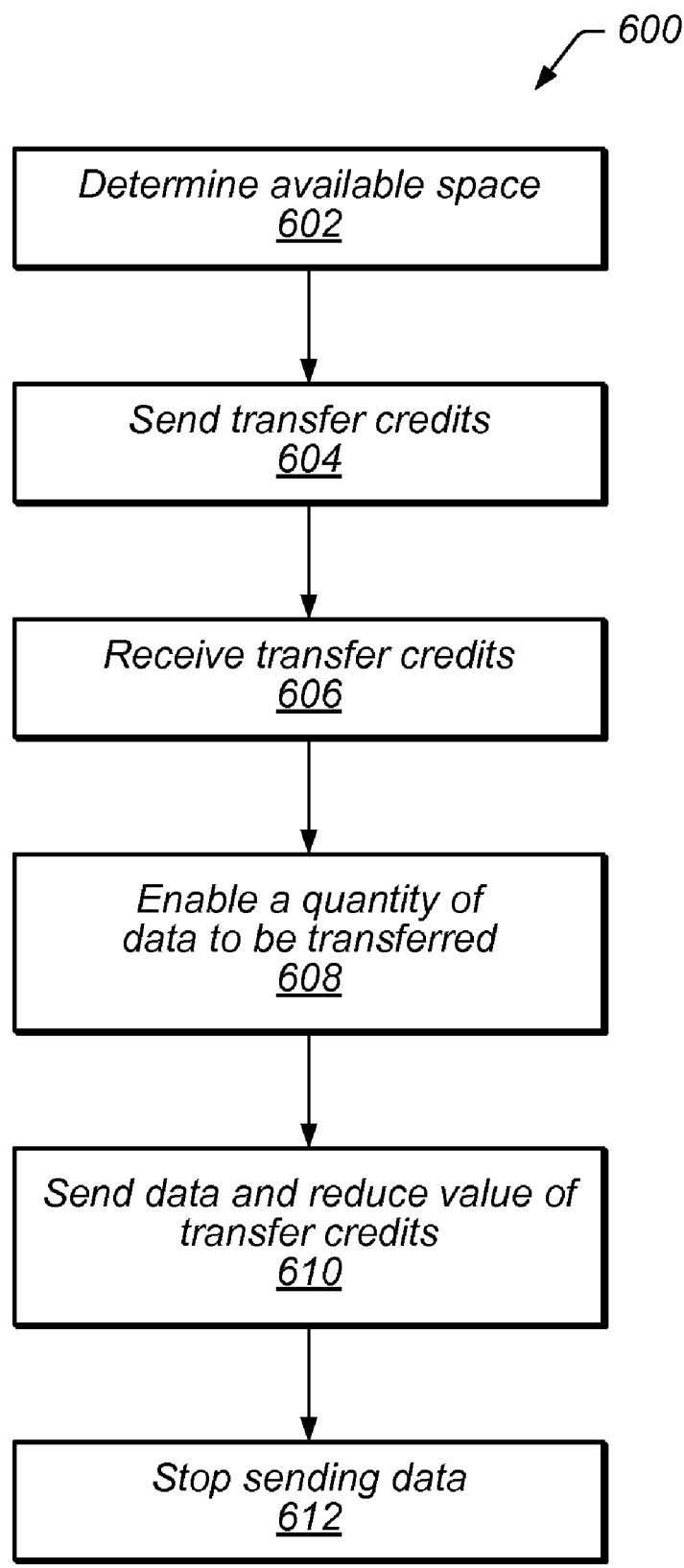
FIG. 6 is a flowchart that illustrates transferring data in accordance with one or more embodiments of the present invention.

Turning now to FIG. 6, depicted is a flow chart of an exemplary method 600 for transferring data between a source device and target device, in accordance with one or more embodiments of the present technique. As depicted at block 602, method 600 may include determining available space. For example, in one embodiment, method 600 may include a target peripheral (e.g. one that may be configured to receive data), determining how much storage space is available (e.g., space available in a FIFO or in a RAM) for receiving data. In one embodiment, the determining of available space may be performed by a device acting on behalf of a target device, such as a controller associated with the target peripheral or a host CPU.

In the illustrated embodiment, method 600 also includes sending transfer credits, as depicted at block 604. In one embodiment, the target device (or a device acting on behalf of the target device) may send transfer credits to a source device that may be configured to send data. This may occur after determining available space at block 602, as depicted in the illustrated embodiment. The amount/value of transfer credit sent by the target device may depend on various factors. For example, in some embodiments, the number of transfer credits issued may be based on the amount of available space determined at block 602, the amount/value of transfer credits previously sent, and/or the quantities data previously received and/or processed at the receiving device. In one embodiment, the number of transfer credits issued may be the same or at least based on the amount of free space available in a buffer of the receiving device. For example, in one embodiment, if a receive FIFO has 256 bytes of storage space for receiving data and 128 bytes have already been received, the receiving device may grant an additional transfer credit of value 128 bytes. In some embodiments, a target device may choose to grant credits corresponding to only a portion of the total space available on the target device. This may be done, for example, to limit the amount of data that may accumulate in a target FIFO. Limiting the amount of data that may accumulate in the target FIFO may reduce the latency for data to be removed from the FIFO.

In the illustrated embodiment, method 600 may also include receiving transfer of credits, as depicted at block 606. In one embodiment, a source device may receive transfer credits sent at block 604. For example, a target device may grant a transfer credit of value 4096 bytes, by writing a value corresponding to 4096 bytes to a specific location on a source device. In the illustrated embodiment, method 600 also includes enabling a quantity of data to be transferred as depicted at block 608. In one embodiment, the quantity of data enabled to be transferred may correspond to an accumulated transfer credit value. In one embodiment, a source peripheral may enable a quantity of data (e.g., based on the accumulated transfer credit value) to be transferred to a target device. In one embodiment the enabling process may involve configuring a DMAC to perform data transfers. In one embodiment, enabling may involve allowing transfer requests to be sent to a DMAC.

In the illustrated embodiment, method 600 further includes sending data and reducing the current value of transfer credits as depicted at block 610. Note that, in some embodiments, data may be sent in accordance with the operation of a data transfer governor. In such embodiments, a data transfer governor may be used to limit the utilization of a bus that a particular device or particular module or particular board may obtain over a specified period of time. In one embodiment, a data transfer governor may be controllable by software and may allow software to specify a level of bus utilization that a device may obtain and may also allow software to specify the interval over which bus utilization is measured and controlled. For example, a data transfer governor may be used to specify a rate, duration, period, and/or frequency at which a device may transfer data across a bus. In one embodiment, a data transfer governor may operate on a shared backplane bus (e.g., PCI) of a computer system. In another embodiment, one or more governors may operate on one or more point-to-point links, such as is found in PCIe-based systems. Such a technique may help to ensure that certain devices do not dominate or shared bus (or shared link), thereby preventing other devices from sufficient access to the shared bus. Depending on the embodiment, a data transfer governor may be used for data writes (e.g., to a host controller memory or to a target device) and/or it may be used for data reads (e.g., from host memory or from a source device).

In one embodiment, the current value of transfer credits may be reduced according to the quantity of data sent. For example, the source device may send data to the target device and may decrement the allocated transfer credit value according to the quantity of data sent. In one embodiment, the transfer credits and/or accumulated transfer credit value may be stored in a counter, and the counter may be progressively decremented as each data item is transferred to the receiving device.

In one embodiment, the transfer of data may be repeated substantially continuously, thereby providing streaming data transfer. However, at some point the source device may, as depicted at block 612, stop sending data. Stopping may include a pause in sending during the streaming of data, and/or may include an end to the streaming of data. In one embodiment, the source device may stop sending data if the accumulated transfer credit value falls below a threshold (e.g., the accumulated value of transfer credits falls to zero). In some embodiments, stopping the sending of data the may involve inhibiting programming of transfer requests into a DMAC.

FIG. 6 depicts a flow that is illustrative of certain embodiments, other embodiments may perform the steps depicted in flow 600 in a different order and/or may perform a subset of the steps depicted in flow 600.

Figure 7:
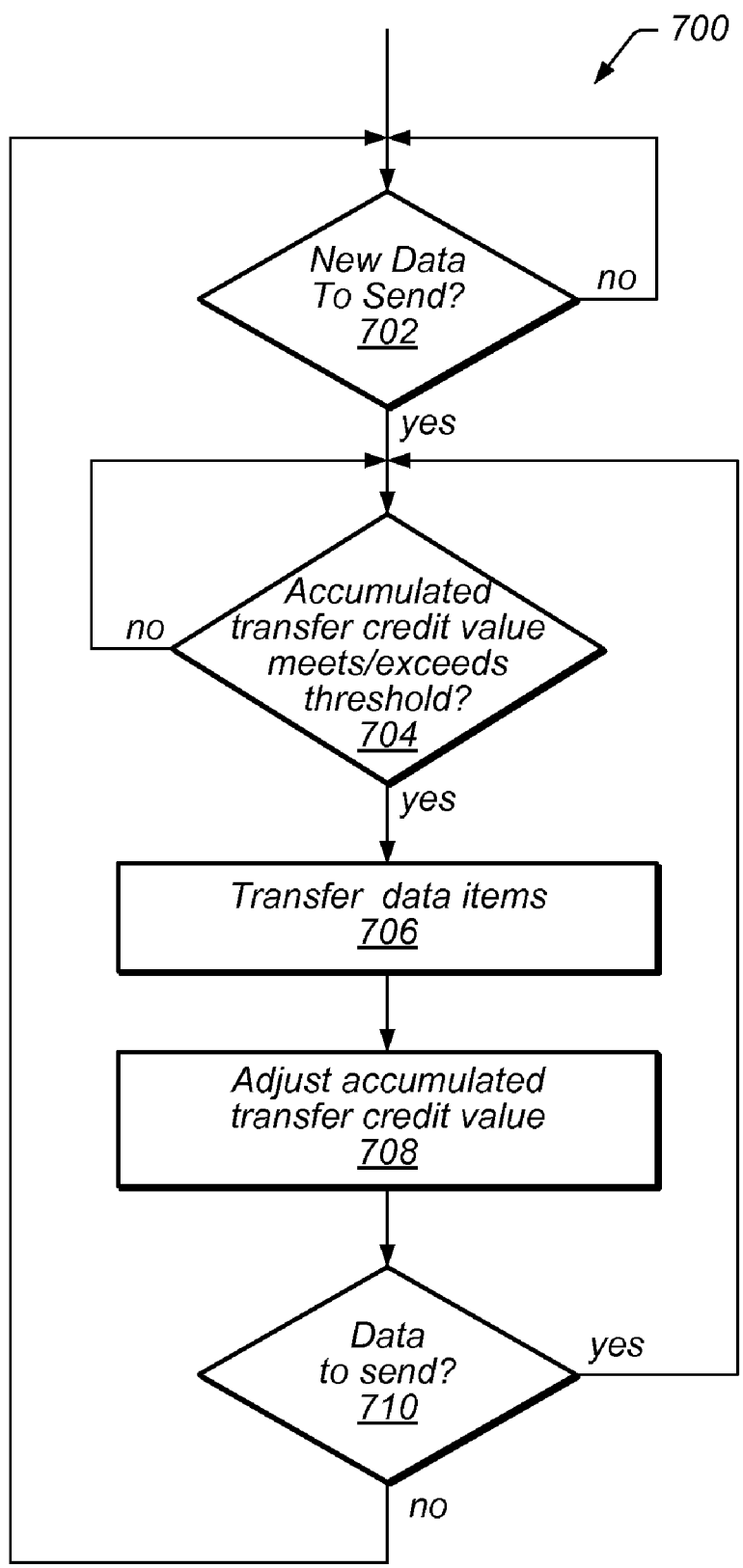
FIG. 7 is a flowchart that illustrates sending data in accordance with one or more embodiments of the present invention.

FIG. 7 is a flowchart that depicts an exemplary method 700 for transferring data in accordance with one or more embodiments of the present technique. Such a technique may be performed by a source device. Moreover, it will be appreciated that method 700 may be implemented in conjunction with any of the techniques described herein, such as those described with respect to FIG. 6. In the illustrated embodiment, method 700 may include determining whether or not there is new data to send, as depicted at block 702. For example, the source device may first determine if there is data to be sent. This may involve determining if there is initial data to be sent and/or may involve determining if there is new data to be sent. For example, it may be determined whether or not data is stored in a buffer/FIFO of the sending device. If there is no new (or initial) data to be sent the sending device may wait until such data is available, repeating step 702 as illustrated.

In the illustrated embodiment, if it is determined that there is new data to be sent, before starting to send data, the sending device may first determine if the accumulated transfer credit value meets or exceeds a threshold, as depicted at block 704. For example, in one embodiment the sending device may determine if the current value of transfer credits is greater than zero. In some embodiments a default value of transfer credits may be automatically granted upon initialization. If the current value of transfer credits does not meet a threshold, the sending device may wait for a target device to grant a sufficient number of transfer credits, as depicted. If there are enough transfer credits, the source device may then start to transfer data to the target device. In one embodiment, the sending of data may be performed by one or more of the source device, a DMAC coupled to the source device, a DMAC module on the source device or a bus master associated with the source device. For ease of explanation, sending may be described hereafter as sending by the source device. In FIG. 7, the sending is depicted as being contained within an iterative loop comprising elements 704, 706, 708 and 710.

In one embodiment, if it is determined (either prior to sending or during sending), that the accumulated transfer credit value meets/exceeds a threshold (block 704) then the source device may transfer one or more data items to the target device, as depicted at block 706. The size of each data item may depend on system characteristics such as the nature of bus connecting the source and target devices.

In some embodiments, determining if the accumulated transfer credit value meets/exceeds a threshold may include determining if there is sufficient data for a specific size/type of data transfer. The ability to stream large quantities of data across a bus may depend upon the utilization of the bus. The utilization of the bus may, in turn, depend on the type of bus transfers performed and may also depend on the quantity of data associated with each data transfer. In buses such as PCIe, each packet may have a fixed amount of overhead, so sending small packets may not make optimum use of the available bus bandwidth. Furthermore, sending larger packets to aligned buffers in memory may make better use of the available target memory bandwidth.

Sending and receiving devices (e.g., peripherals) may make better use of transfer bandwidth of a connecting bus (or some other type of link) by using a transfer quantity value known as Preferred Packet Size (PPS). In some embodiments, the sending of data may be delayed until a quantity of data corresponding to the PPS is available for sending. Then, when at least a PPS quantity of data is available, data of PPS size may be sent. Similarly, in some embodiments, the requesting of data (to be sent to the receiving device) may be delayed until a quantity of storage space of PPS size is available for receiving. Then, when at least a PPS quantity of space is available, the requesting of data of PPS size may be made. In some embodiments, where the peripheral-to-peripheral link is PCIe the PPS may be, for example, set to 128 bytes. In some embodiments the PPS may be set to, for example, $2^N$ bytes, where N is an integer so that, for example the PPS may be set to 64 bytes, 256 bytes or 2048 bytes, etc.

In some embodiments, a technique referred to as an "Eviction Timer" (ET) may be used in association with PPS. For example, an ET may be used to cause a data to be sent when less than a PPS quantity of data has been accumulated. For example, an ET may set a given period of time to wait for a given amount of data (e.g., a PPS) to accumulate. If enough data is accumulated (e.g., at least a PPS) before the expiration of the ET, then the data may be sent. If enough data is not accumulated before the expiration of the ET, then the data present may be sent, regardless of whether or not it meets the given amount. This may be useful when quantity of data waiting to be transferred is not a multiple of the PPS. An ET may be programmable and may be set, for example, to a value of 1 uS. Circuitry associated with an ET may reset the ET every time a new data item for sending is obtained.

In conjunction with sending, the accumulated transfer credit value may be adjusted, as depicted at block 708. In one embodiment, the accumulated transfer credit value may be decremented by reducing the current value of transfer credits by a number indicative of the quantity of data sent. In another embodiment, the accumulated transfer credit value may be decremented by increasing a number indicative of the value of used transfer credits. Other embodiments may utilize various other methods of counting the amount of credits used and comparing the used credits against the number of credits granted, thereby decreasing (as data is sent) accumulated transfer credit value.

After transferring one or more data items, the source device may determine if there is more data to send as depicted at block 710. If there are more data items to be sent then while the current value of transfer credits meets/exceeds a threshold, as determined at block 704, the transferring of data may continue. If however, the current value of transfer does not meet/exceed a threshold, the source device may wait for additional transfer credits to be granted (e.g., looping at block 704). In one embodiment the threshold may be set to zero but in other embodiments the threshold may be non-zero. The threshold may be set so that, for example, a specific type of data transfer may not cause the value of granted transfer credits to fall below zero.

FIG. 7 depicts a flow that is illustrative of certain embodiments, other embodiments may perform the steps depicted in flow 700 in a different order and/or may perform a subset of the steps depicted in flow 700.

Figure 8:
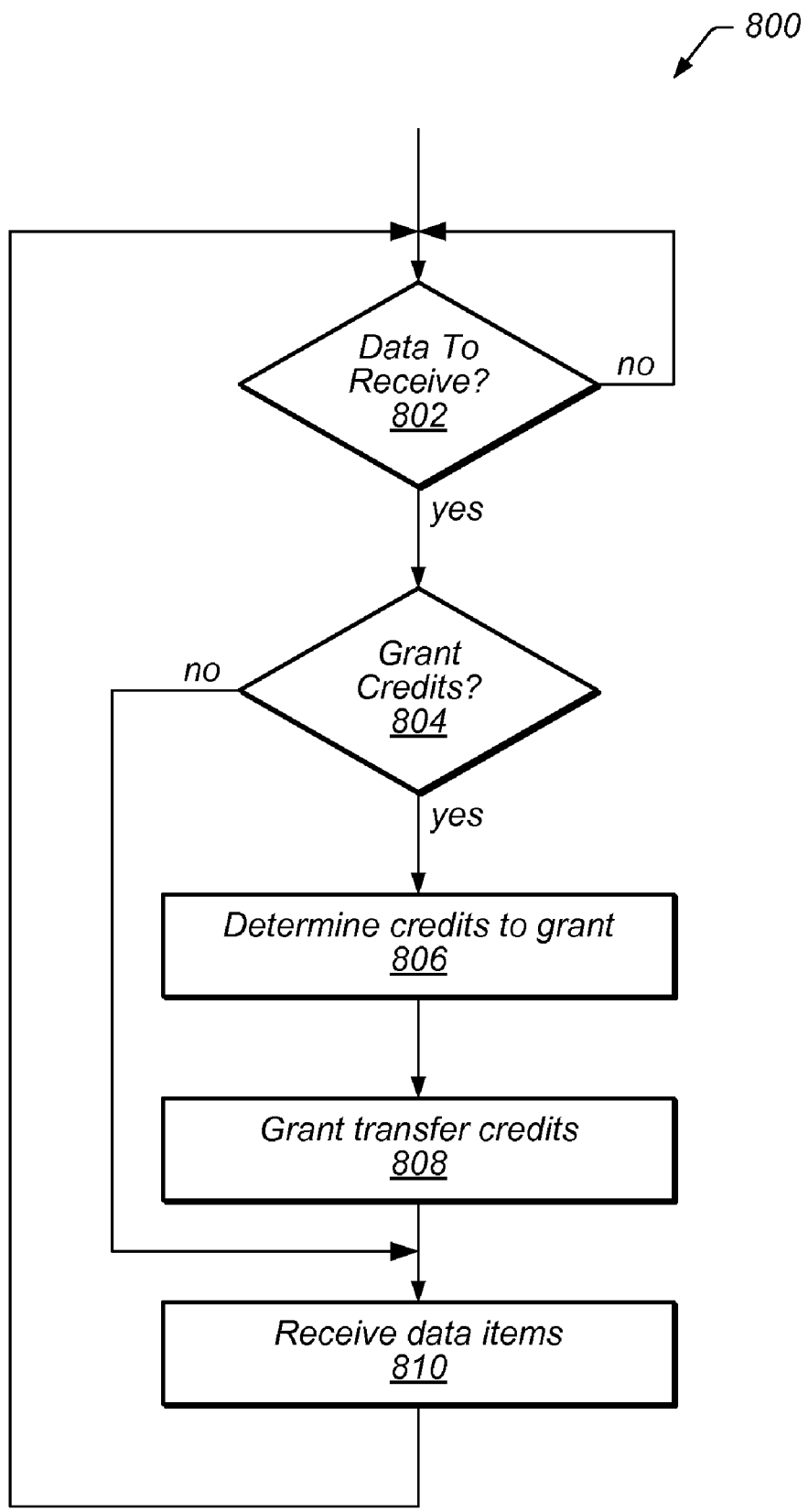
FIG. 8 is a flowchart that illustrates receiving data in accordance with one or more embodiments of the present invention.

FIG. 8 is a flowchart that depicts an exemplary method 800 for receiving data in accordance with one or more embodiments of the present technique as may be performed by a target (e.g. receiving) peripheral/device. In the illustrated embodiment, method 800 may include determining whether there is data to receive, as depicted at block 802. In one embodiment, a target peripheral may determine if there is data to be received. This may involve determining if there are initial data to be received and it may also involve determining if there are new data to be received. On determining that there is no new (or initial) data to be received the target device may wait (e.g., perform other activities) until it is determined that there is data to receive. In some embodiments, determining if there is data to receive may involve determining if there is sufficient storage space to receive data.

In one embodiment, method 800 may include determining whether or not to grant transfer credits, as depicted at block 804. For example, before starting to receive data, a receiving device (e.g. target peripheral) may determine if it should grant transfer credits to the sending device. As discussed above, if a sending device (e.g. source peripheral) does not have sufficient transfer credits it may not send data. Determining whether to grant transfer credits may involve many factors. For example, it may involve determining the value of transfer credits already granted, the quantity of data received, and/or determining free storage space on the receiving device. The amount of storage space may dynamically change as data is received (reducing the amount of free storage space) and received data is processed (increasing the amount of free storage space.

In some embodiments, method 800 may include determining the value of transfer credits to grant, as depicted at block 806. Determining this value may involve many factors. For example, it may involve determining the value of transfer credits previously granted, the quantities of data received, and/or free storage space. Furthermore, the frequency at which to grant transfer credits may be determined by the receiving device based on factors such as the total amount of storage on the receiving device and the amount of bus traffic generated by said granting of transfer credits. Less frequent grants of more transfer credits may generate less bus traffic than more frequent grants of fewer transfer credits.

Once the value of transfer credits to grant has been determined, the credits may be granted, as depicted at block 808. In one embodiment, credits are granted/issued to the source device. Granting of the transfer credits may enable the source peripheral to start or continue sending data items as described above.

As depicted at block 810, method 800 may also include receiving one or more data items. For example, after sufficient credits have been granted, the source device may send data as described above, and the data may be received at the target device. Generally speaking, a receiving device (e.g. target peripheral, target device) may process received data in some fashion. In certain embodiments, a target device may analyze received data and/or convert received data. In certain embodiments, a receiving device may process portions of received data and discard other portions of received data. In certain embodiments a receiving device may not substantially process received data but may act as a conduit and forward received data (e.g., for display, for storage or for transfer across a communications link). Commonly, embodiments may free up storage space as received data is processed and this may allow the receiving device to grant more transfer credits. As depicted, method 800 may also include returning to block 802 to determine if there is more data to be received. As described above, the process of sending and receiving described with respect to FIGS. 7 and 8 may occur in concert (e.g. in parallel) such that data may be streamed continuously between the devices. FIG. 8 depicts a flow that is illustrative of certain embodiments, other embodiments may perform the steps depicted in flow 800 in a different order. For example, in some embodiments step 802 may be performed between steps 808 and 810.

Certain embodiments described herein help to prevent transactions from existing in a shared fabric unless a target is capable of receiving them, thereby helping to reduce clogging of the fabric and reducing the likelihood of overflow/underflow conditions on some devices, such as the target and source devices. For instance, sending data only when a device is capable of receiving it may reduce the number of pending transfers that could otherwise clog a fabric.

Although the embodiments above have been described in considerable detail, numerous variations and modifications will become apparent to those skilled in the art once the above disclosure is fully appreciated. It is intended that the following claims be interpreted to embrace all such variations and modifications. Furthermore, note that the word "may" is used throughout this application in a permissive sense (e.g., having the potential to, being able to), not a mandatory sense (e.g., must). The term "include", and derivations thereof, mean "including, but not limited to". As used in this specification, the singular forms "a", "an" and "the" include plural referents unless the content clearly indicates otherwise. Thus, for example, reference to "a device" includes a combination of two or more devices.

We claim:

1. A method of transferring data within a computer system comprising:
   identifying data to be sent from a source device to a target device;
   receiving, at the source device, one or more transfer credits from the target device, wherein the one or more transfer credits are indicative of an amount of data that the target device is authorizing to be sent from the source device to the target device;
   incrementing an accumulated transfer credit value based on the one or more transfer credits received;
   determining whether or not the accumulated transfer credit value incremented satisfies a send threshold value; and
   if the accumulated transfer credit value satisfies the send threshold value:
      sending data from the source device to the target device; and
      modifying the accumulated transfer credit value based on a quantity of data sent; and
   if the accumulated transfer credit value does not satisfy the send threshold value, not sending the data from the source device to the target device.

2. The method of claim 1, wherein receiving comprises receiving, at the source device via memory-mapped data transfer, one or more transfer credits from the target device.

3. The method of claim 1, wherein sending data from the source device to the target device comprises sending the data to an intermediate device, and the intermediate device forwarding the data sent to the target device.

4. The method of claim 1, wherein both the source device and the target device comprise peripheral devices.

5. The method of claim 1, wherein both the source device and the target device are not a processor or memory of a host controller.

6. The method of claim 1, wherein the sending of data occurs directly between the source device and the target device.

7. The method of claim 6, wherein the transfer of data occurs without passing data to or through a processor or memory of a host controller.

8. The method of claim 1, wherein a transfer credit comprises a value indicative of an incremental quantity of data to be received by the target device.

9. The method of claim 1, further comprising:
   disabling the ability to transfer data from the source device to the target device if the accumulated transfer credit value does not satisfy the send threshold value.

10. The method of claim 9, wherein the send threshold value is indicative of an accumulated transfer credit value of zero.

11. The method of claim 1, further comprising:
    enabling the transfer of data in response to receiving a transfer credit.

12. The method of claim 1, further comprising providing to the target device a total transfer value indicative of a quantity of data transferred since the start of an associated data transfer.

13. The method of claim 1, further comprising:
    providing to the target device an indication that a specific quantity of data has been sent from the source device.

14. The method of claim 1, wherein sending data from the source device to the target device further comprises:
    waiting until a specific quantity of data is available for transfer; and
    sending the specific quantity of data when it becomes available.

15. The method of claim 14, wherein sending data from the source device to the target device data further comprises:
    measuring the interval between successive data items being made available for transfer; and
    sending available data if the interval exceeds a specific value.

16. The method of claim 1, further comprising:
    determining, at the target device, one or more suitable quantities of data to be received; and sending, from the target device to the source device, one or more transfer credits corresponding to the one or more suitable quantities of data to be received.

17. The method of claim 16, wherein one of the one or more transfer credits is based on available space at the target device for receiving the data.

18. The method of claim 16, wherein determining one or more suitable quantities of data to be received comprises, one or more of:
   determining the total quantity of data received;
   determining the total value of transfer credits granted; and
   determining the quantity of storage space for receiving data.

19. The method of claim 16, wherein sending, from the target device to the source device, one or more transfer credits corresponding to the one or more suitable quantities of data to be received comprises:
   communicating, by the target device, directly to the source device one or more values corresponding to the one or more transfer credits.

20. A computer peripheral device, comprising:
   a buffer configured to store data to be sent from the peripheral device to a target device;
   a data output configured to enable communication with the target device via a bus of a computer system; and
   a transfer controller configured to regulate the transfer of data from the buffer to the bus, wherein the controller is configured to:
      receive one or more transfer credits from the target device, wherein the one or more transfer credits are indicative of an amount of data that the target device is authorizing to be sent from the source device to the target device;
      incrementing an accumulated transfer credit value based on the one or more transfer credits received;
      determine whether or not the accumulated transfer credit value incremented satisfies a send threshold value; and
      if the accumulated transfer credit value satisfies the send threshold value:
         send data from the peripheral device to the target device; and
         modify the accumulated transfer credit value based on a quantity of data sent; and
      if the accumulated transfer credit value does not satisfy the send threshold value, not send the data from the peripheral device to the target device.

21. A computer system comprising
   a host computer device;
   a first peripheral device coupled to a bus of the computer system; and
   a second peripheral device coupled to a bus of the computer system;
   wherein the first peripheral device comprises a first memory location and is configured to provide a transfer credit to the second peripheral device based on free space available or expected to be available in the first memory location;
   wherein the second peripheral device is configured to send data to the first memory location of the first peripheral device and is configured to send at least a portion of the data to the first peripheral device via an interconnect based on the provided transfer credit;
   wherein the second peripheral device comprises a memory location configured to receive one or more values corresponding to transfer credits; and
   wherein, if an accumulated transfer credit value satisfies a threshold, the second peripheral device is configured to enable the transfer of data to the first peripheral device.

* * * * *